(12) United States Patent
Zatylny et al.

(10) Patent No.: US 9,785,616 B2
(45) Date of Patent: Oct. 10, 2017

(54) METHOD AND APPARATUS FOR DETERMINING THRESHOLD BASELINES BASED UPON RECEIVED MEASUREMENTS

(71) Applicant: SolarWinds WorldWide, LLC, Austin, TX (US)

(72) Inventors: Karlo Martin Zatylny, Dripping Springs, TX (US); Lukas Belza, Kvasice (CZ); Martin Susil, Brno (CZ); Zeid Adly Derhally, Washington, DC (US); Susan Allison Chopra, Austin, TX (US)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 667 days.

(21) Appl. No.: 14/331,969

(22) Filed: Jul. 15, 2014

(65) Prior Publication Data

US 2016/0019185 A1 Jan. 21, 2016

(51) Int. Cl.
*G06F 17/18* (2006.01)
*G06Q 10/06* (2012.01)

(52) U.S. Cl.
CPC ............ *G06F 17/18* (2013.01); *G06Q 10/06* (2013.01)

(58) Field of Classification Search
CPC ....................................................... G06F 17/18

(Continued)

(56) References Cited

U.S. PATENT DOCUMENTS 7,181,364 B2 * 2/2007 Lancaster ............. G06F 11/008
702/179
7,225,103 B2 * 5/2007 Beresniewicz .... G05B 23/0235
700/26

(Continued)

FOREIGN PATENT DOCUMENTS

JP 2010-506253 A 2/2010
WO 2008/031208 A1 3/2008
WO 2008/042786 A2 4/2008

OTHER PUBLICATIONS

European Search Report application No. 15174976.9 dated Dec. 22, 2015.

(Continued)

*Primary Examiner* — Ricky Ngon
(74) *Attorney, Agent, or Firm* — Squire Patton Boggs (US) LLP (57) ABSTRACT

A method and apparatus can be configured to receive a data set of values relating to a process. The data set of values correspond to values measured while the process is performed over a duration of time. The method also includes performing first statistical calculations on a first data subset of values. The values of the first data subset is a subset of the entire received data set of values. The values of the first data subset of values correspond to values that are of a first timeframe of the duration of time. The method also includes displaying first calculated results of the first statistical calculations. The method also includes determining whether performing the process has crossed a first threshold baseline. The first threshold baseline is based on the first statistical calculations. The method also includes transmitting a first alert to a user if the process is determined to have crossed the first threshold baseline.

20 Claims, 6 Drawing Sheets

(58) Field of Classification Search
USPC .......................................................... 702/179
See application file for complete search history.

(56) References Cited

U.S. PATENT DOCUMENTS

| | | | |
|---|---|---|---|
| 7,756,840 B2* | 7/2010 | Warshawsky | G06F 17/30368 |
| | | | 702/179 |
| 7,912,676 B2* | 3/2011 | Miller | G05B 23/021 |
| | | | 702/179 |
| 2008/0140348 A1* | 6/2008 | Frank | G06F 17/3061 |
| | | | 702/181 |
| 2014/0108324 A1* | 4/2014 | Chen | G06F 17/18 |
| | | | 706/52 |

OTHER PUBLICATIONS

Japanese Notice of Rejection Reason application No. 2016-141208 dated Nov. 29, 2016.

* cited by examiner

METHOD AND APPARATUS FOR DETERMINING THRESHOLD BASELINES BASED UPON RECEIVED MEASUREMENTS

BACKGROUND

Field

Embodiments of the invention relate to determining threshold baselines based upon the received measurements, and analyzing the received measurements using the determined threshold baselines.

Description of the Related Art

A threshold baseline can generally be considered to be at least one reference value which serves as a basis for defining a change from one state to another state. For example, a threshold baseline can differentiate an "undesirable" state from a "desirable" state, or an "out-of-control" state from a "controlled" state, or an "abnormal" state from a "normal" state. Users can monitor whether a measurement of a process crosses a threshold baseline. As such, threshold baselines can be used to analyze these measurements of the process by differentiating which state each of the measurements corresponds to. Monitoring and controlling the process in accordance with the threshold baseline can ensure that the process operates at a desirable level, for example.

SUMMARY

According to a first embodiment, a method may include receiving, by a processor, a data set of values relating to a process. The data set of values correspond to values measured while the process is performed over a duration of time. The method may also include performing first statistical calculations on a first data subset of values. The values of the first data subset is a subset of the entire received data set of values. The values of the first data subset of values correspond to values that are of a first timeframe of the duration of time. The method may also include displaying first calculated results of the first statistical calculations. The method may also include determining whether performing the process has crossed a first threshold baseline. The first threshold baseline is based on the first statistical calculations. The method may also include transmitting a first alert to a user if the process is determined to have crossed the first threshold baseline.

In the method of the first embodiment, the receiving the data set of values corresponds to receiving numerical values that are regularly sampled over the duration of time.

In the method of the first embodiment, the method may also include performing second statistical calculations on a second data subset of values. The values of the second data subset is a subset of the entire received data set of values, and the values of the second data subset of values correspond to values that are of a second timeframe of the duration of time. The method may also include displaying second calculated results of the second statistical calculations. The method may also include determining whether performing the process has crossed a second threshold baseline. The second threshold baseline is based on the second statistical calculations. The method may also include transmitting a second alert to the user if the process is determined to have crossed the second threshold baseline.

In the method of the first embodiment, the method may also include displaying a first distribution. The first distribution illustrates the frequency that each value occurs within the first timeframe of the duration of time.

In the method of the first embodiment, the method may also include displaying a second distribution. The second distribution illustrates the frequency that each value occurs within the second timeframe of the duration of time.

According to a second embodiment, an apparatus may include at least one processor. The apparatus may also include at least one memory including computer program code. The at least one memory and the computer program code may be configured, with the at least one processor, to cause the apparatus at least to receive a data set of values relating to a process. The data set of values correspond to values measured while the process is performed over a duration of time. The apparatus may also be caused to perform first statistical calculations on a first data subset of values. The values of the first data subset is a subset of the entire received data set of values, and the values of the first data subset of values correspond to values that are of a first timeframe of the duration of time. The apparatus may also be caused to display first calculated results of the first statistical calculations. The apparatus may also be caused to determine whether performing the process has crossed a first threshold baseline. The first threshold baseline is based on the first statistical calculations. The apparatus may also be caused to transmit a first alert to a user if the process is determined to have crossed the first threshold baseline.

In the apparatus of the second embodiment, the receiving the data set of values corresponds to receiving numerical values that are regularly sampled over the duration of time.

In the apparatus of the second embodiment, the apparatus is further caused to perform second statistical calculations on a second data subset of values. The values of the second data subset is a subset of the entire received data set of values, and the values of the second data subset of values correspond to values that are of a second timeframe of the duration of time. The apparatus is further caused to display second calculated results of the second statistical calculations. The apparatus is further caused to determine whether performing the process has crossed a second threshold baseline. The second threshold baseline is based on the second statistical calculations. The apparatus is further caused to transmit a second alert to the user if the process is determined to have crossed the second threshold baseline.

In the apparatus of the second embodiment, the apparatus is further caused to display a first distribution. The first distribution illustrates the frequency that each value occurs within the first timeframe of the duration of time.

In the apparatus of the second embodiment, the apparatus is further caused to display a second distribution. The second distribution illustrates the frequency that each value occurs within the second timeframe of the duration of time.

According to a third embodiment, a computer program product may be embodied on a non-transitory computer readable medium. The computer program product may be configured to control a processor to perform a process including receiving a data set of values relating to a process. The data set of values correspond to values measured while the process is performed over a duration of time. The process may include performing first statistical calculations on a first data subset of values. The values of the first data subset is a subset of the entire received data set of values. The values of the first data subset of values correspond to values that are of a first timeframe of the duration of time. The process may also include displaying first calculated results of the first statistical calculations. The process may also include determining whether performing the process has crossed a first threshold baseline. The first threshold baseline is based on the first statistical calculations. The process may also include transmitting a first alert to a user if the process is determined to have crossed the first threshold baseline.

In the computer program product of the third embodiment, the receiving the data set of values corresponds to receiving numerical values that are regularly sampled over the duration of time.

In the computer program product of the third embodiment, the process further includes performing second statistical calculations on a second data subset of values. The values of the second data subset is a subset of the entire received data set of values. The values of the second data subset of values correspond to values that are of a second timeframe of the duration of time. The process may also include displaying second calculated results of the second statistical calculations. The process may also include determining whether performing the process has crossed a second threshold baseline. The second threshold baseline is based on the second statistical calculations. The process may also include transmitting a second alert to the user if the process is determined to have crossed the second threshold baseline.

In the computer program product of the third embodiment, the process further includes displaying a first distribution. The first distribution illustrates the frequency that each value occurs within the first timeframe of the duration of time.

In the computer program product of the third embodiment, the process further includes displaying a second distribution. The second distribution illustrates the frequency that each value occurs within the second timeframe of the duration of time.

According to a fourth embodiment, an apparatus may include receiving means that receives a data set of values relating to a process. The data set of values correspond to values measured while the process is performed over a duration of time. The apparatus may also include first performing means that performs first statistical calculations on a first data subset of values. The values of the first data subset is a subset of the entire received data set of values, and the values of the first data subset of values correspond to values that are of a first timeframe of the duration of time. The apparatus may also include first displaying means that displays first calculated results of the first statistical calculations. The apparatus may also include first determining means that determines whether performing the process has crossed a first threshold baseline. The first threshold baseline is based on the first statistical calculations. The apparatus may also include first transmitting means that transmits a first alert to a user if the process is determined to have crossed the first threshold baseline.

In the apparatus of the fourth embodiment, the receiving the data set of values corresponds to receiving numerical values that are regularly sampled over the duration of time.

In the apparatus of the fourth embodiment, the apparatus may also include second performing means that performs second statistical calculations on a second data subset of values. The values of the second data subset is a subset of the entire received data set of values, and the values of the second data subset of values correspond to values that are of a second timeframe of the duration of time. The apparatus may also include second displaying means that displays second calculated results of the second statistical calculations. The apparatus may also include second determining means that determines whether performing the process has crossed a second threshold baseline. The second threshold baseline is based on the second statistical calculations. The apparatus may also include second transmitting means that transmits a second alert to the user if the process is determined to have crossed the second threshold baseline.

In the apparatus of the fourth embodiment, the apparatus may also include a third displaying means that displays a first distribution. The first distribution illustrates the frequency that each value occurs within the first timeframe of the duration of time.

In the apparatus of the fourth embodiment, the apparatus also includes a fourth displaying means that displays a second distribution. The second distribution illustrates the frequency that each value occurs within the second timeframe of the duration of time.

BRIEF DESCRIPTION OF THE DRAWINGS

For proper understanding of the invention, reference should be made to the accompanying drawings, wherein.

DETAILED DESCRIPTION

Embodiments of the invention relate to determining threshold baselines based upon the received measurements, and analyzing the received measurements using the determined threshold baselines. Embodiments of the present invention may collect or receive a data set of measurements/values relating to a process. The measurement/values can include numerical values. The term "measurements" and "values" can be used interchangeably herein. In one embodiment, the data set of values can be values which correspond to measurements that are sampled over a duration of time. The sampling over the duration of time can be a regular sampling or a non-regular sampling. In one embodiment, the received data set can correspond to sampled network-device response-time values (as measured in milliseconds, for example). Although the received data set can correspond to network-device response times in one embodiment, the received data set of other embodiments may correspond to other measured values.

After the data set of measurements/values is collected/received, embodiments of the present invention can then perform different statistical calculations on the data set of measurements/values in order to determine an appropriate output. The appropriate output can include a plurality of calculated results, as described in more detail below. The appropriate output can also include a set of recommendations for threshold baselines. If a threshold baseline is exceeded and/or met, the system can alert the user that the threshold has been exceeded and/or met. For example, if a threshold baseline is crossed by values of a related process, embodiments of the present invention can warn/notify the user that the process has crossed the threshold baseline. If another threshold baseline is crossed by the values of the related process, embodiments of the present invention can warn/notify the user that the process has crossed another threshold baseline. Different warnings/notifications can correspond to problems of differing severity.

Certain embodiments of the present invention can perform the above-described calculations (to determine the calculated results) based on the entirety of received measurements/values (the entire dataset of values). Other embodiments of the present invention can perform the calculations based on a subset of the received values. For example, embodiments of the present invention can perform the statistical calculations (to determine the calculated results) on the specific values/measurements that correspond to specific time ranges within the entirety of received values. These specific values/measurements form a subset of the entire dataset of values. By performing the statistical calculations on values/measurements corresponding to specific time ranges, embodiments of the present invention can better inform users about data patterns and/or irregularities within the values/measurements.

With any given data set, embodiments of the present invention can provide calculated results such as a minimum, maximum, mean, and a standard deviation. The specific time ranges for the measurements can include, but are not limited to, the entirety of time ranges, weekday work hours, night hours, and/or weekend hours. In addition to providing calculated results such as mean, minimum, maximum, and standard deviation, embodiments of the present invention can also calculate other statistical calculations, such as statistically-significant percentile levels. For example, one embodiment can determine a 95th percentile level, where 95% of the measurements are less than or equal to the value corresponding to the $95^{th}$ percentile level. The statistically-significant percentile levels can be determined in accordance with the calculated mean and standard deviation values.

Embodiments of the present invention can perform the statistical calculations (to yield the calculated results) on the received data set of measurements in accordance to a schedule. The statistical calculations can be performed in accordance to a schedule in order to dynamically determine/change threshold baseline values as the underlying data (from which each threshold baseline value is derived) changes, as described in more detail below.

For example, suppose that a user configures an embodiment of the present invention to perform/execute the statistical calculation on a regular basis (such as a daily basis). The regular basis can also correspond to other time frames such as an hourly basis, a weekly basis, and/or a monthly basis, for example. Further suppose that the user configures embodiments of the present invention to use a dynamic threshold baseline value that is based on a mathematical mean value in conjunction with a standard deviation value, such as a dynamic threshold baseline value corresponding to mean+(2×standard deviation). To illustrate how a threshold baseline can dynamically change, the threshold baseline value (for network-device response times) may change from 100 ms to 120 ms if, for example, the mean changes from 100 ms to 110 ms while the standard deviation is kept at, for example, 5 ms.

Embodiments of the present invention can perform the statistical calculations on the following types of measurements/values, when applicable.

MS SQL—Average Lock Wait Time
MS SQL—Full Scans/sec
MSSQL—Compilations/Recompilations/Sec
Exchange—RPC Averaged Latency
Exchange—Copy Queue Length As described above, embodiments of the present invention can dynamically determine threshold baselines. As discussed above, the threshold baseline alerts can be dynamically determined in accordance to the most-current measurements/values that are received. For example, suppose that a threshold baseline is set at (mean+(3×standard deviation)), and the calculated mean and standard deviation correspond to 10 and 2, respectively. Thus, the determined threshold baseline is 16. In this example, a subsequently received measurement/value of 16 or greater would trigger the alert. However, if the mean and standard deviation were to change to 11 and 3, respectively, and the scheduled recalculation of the threshold baseline has occurred, then it would take a subsequently received value of 20 or greater to trigger the critical alert. With this method, embodiments of the present invention are able to take the changing environment data into consideration, and embodiments of the present invention are able to take data trends into consideration so that the alerting settings move with the mean and standard deviation of the current data set of measurements/values.

Figure 1:
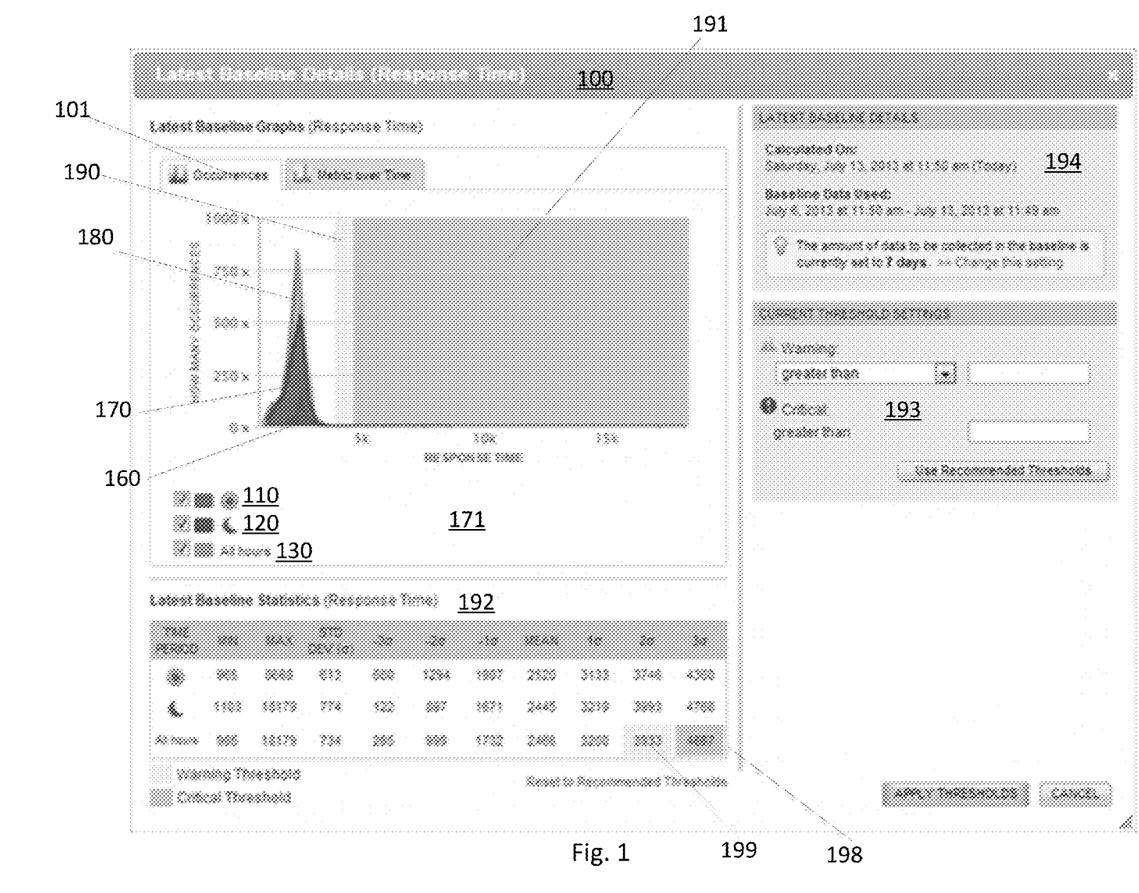
FIG. 1 illustrates a user interface that may be shown by a monitor or a display in accordance with one embodiment.

FIG. 1 illustrates a user interface 100 that may be shown by a monitor or a display in accordance with one embodiment. The user interface 100 includes a data summarization table 192 and a data frequency chart 171. Data frequency chart 171 may be accessed via a tab 101. As shown in FIG. 1, different time ranges can be shown by different colors and symbols. A symbol, such as sun symbol 110, can correspond to a (daytime) time range of, for example, Monday through Friday, 8 AM to 5 PM, and the moon symbol 120 can correspond to an evening time range that is not covered by the sun hours. The "All Hours" designation 130 can correspond to all hours of the day. Once a symbol is selected, the statistical calculations may be based on measurements that are sampled during the time corresponding to the selected symbol.

The interface 100 can include a data frequency chart 171. Data frequency chart 171 can illustrate different distributions. For example, distribution 160 may reflect the measurements which are sampled during the time range of the sun symbol 110 (Monday through Friday, 8 AM to 5 PM), for example. Each distribution may illustrate how many times each value occurred within the corresponding time range. For example, referring to the example of FIG. 1, distribution 160 shows that all values (i.e., response times) sampled during the time range of Monday through Friday 8 AM to 5 PM, which had values ranging from 0 k to 5 k, each occurred between 0 and 250 times. Referring to distribution 160, the value which occurred most often is a response time of approximately 2 k, which occurred approximately 125 times. Distribution 170 may reflect the values sampled during the hours that are not covered by the sun hours, such as hours corresponding to the moon symbol 120. Distribution 180 may reflect the values corresponding to the "All Hours" designation 130.

A data summarization table 192 can display the above-described calculated results for each of the different time periods. As described above, the calculated results can include a minimum value, a maximum value, a standard deviation value, a mean value, and statistically-significant values (such as values that correspond to standard deviations away from the mean), for example. Data summarization table 192 displays calculated results for each of the previously-described time ranges of symbols/designations 110, 120, and 130. Data summarization table 192 can list the calculated results in an ascending (or descending) order corresponding to (mean−3σ), (mean−2σ), (mean−σ), mean, (mean+σ), (mean+2σ), (mean+3σ), for example. Other embodiments can include calculated results that are more or less than "three σ" from the mean.

Data summarization table 192 can also indicate if any of the calculated results correspond to threshold values. As described above, one type of threshold value can be a "warning threshold." Another type of threshold value can be a "critical threshold."

In the example of FIG. 1, data summarization table 192 indicates that, for the "all hours" time range, a value of "3933" (corresponding to 2σ from the mean) is a "warning" threshold value. Data summarization table 192 also indicates that, for the "all hours" time range, a value of "4667" (corresponding to 3σ from the mean) is a "critical" threshold value.

Each of the thresholds may also be displayed in the data frequency chart 171. The thresholds can appear as boundaries in the displayed chart. For example, the "warning" value of "3933" appears as boundary 190 in the displayed data frequency chart 171. The "critical" value of "4667" appears as boundary 191 in the displayed data frequency chart 171.

In view of the above, users of embodiments of the present invention can use default baseline thresholds or can enter their own settings based on the received measurements/values, and the users can visually monitor the data according to those configurations. In view of the above, embodiments of the present invention can provide the user with a clearer picture on how the received measurements/values appear and how frequently the received measurements/values trigger an alert at the warning and critical levels.

Window 194 can also inform a user as to when the statistical calculations of the data summarization table 192 were last calculated/updated. Referring to the example of window 194, the statistical values were last calculated/updated on Saturday, July 13 at 11:50 AM. Window 194 can also indicate the specific duration of time during which the values were sampled. In certain embodiments, window 194 can allow a user to schedule when and at what frequency the statistical calculations are to be performed.

Interface 100 may also include a window 193 that allows a user to define current threshold settings. For example, a user can determine that a warning threshold is crossed when values are "greater than" a designated value, which serves as a threshold baseline. Window 193 can also allow a user to determine that a critical threshold is crossed when values are "greater than" another designated value. Window 193 can also allow a user to determine that thresholds are crossed when values are "equal to" or "less than" designated values.

Figure 2:
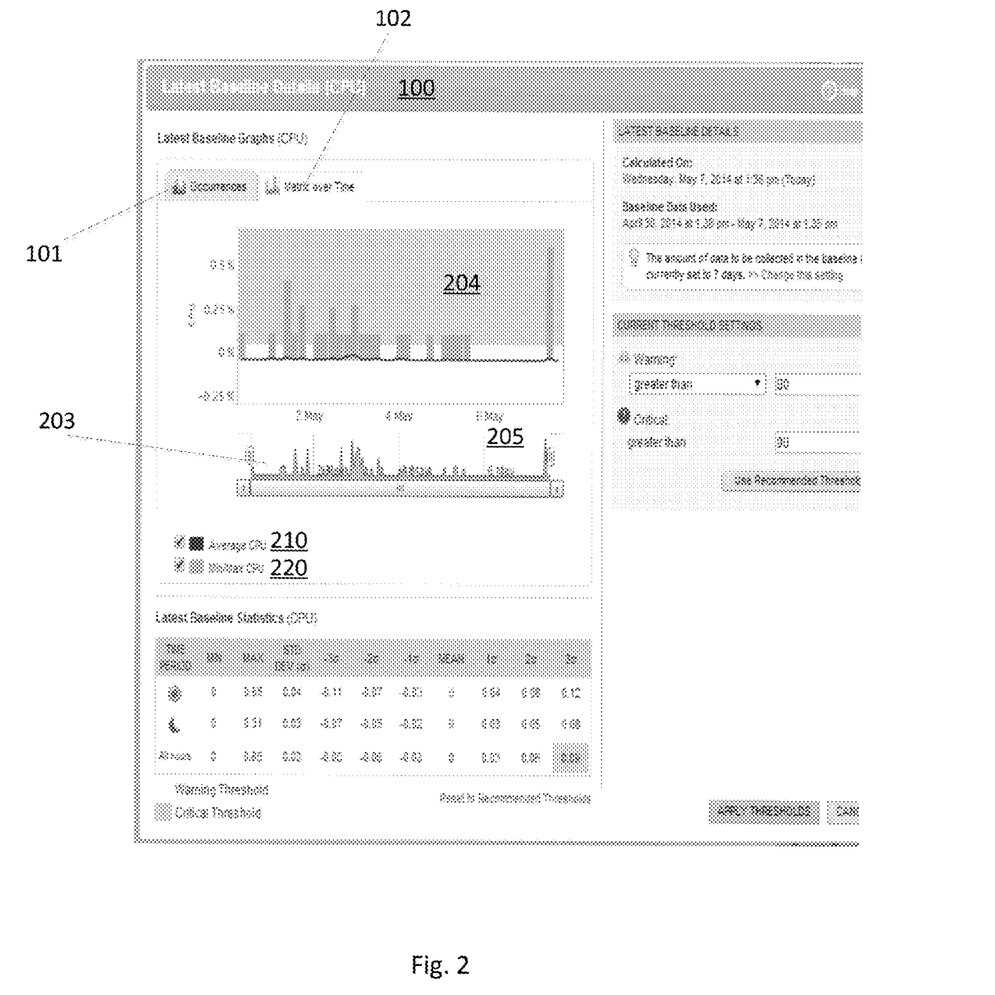
FIG. 2 illustrates a user interface that may be shown by a monitor or a display in accordance with another embodiment.

FIG. 2 illustrates a user interface 100 that may be shown by a monitor or a display in accordance with another embodiment. User interface 100 can include a data summarization table and data frequency charts 204 and 205. Data frequency charts 204 and 205 can be accessed via tab 102. Data frequency chart 205 illustrates a chart of measured values over time. In the example of FIG. 2, the measured values may correspond to CPU usage values. Data frequency charts 204 and 205 can also include charted "Average CPU" 210 values or charted "Min/Max CPU" 220 values.

Figure 3:
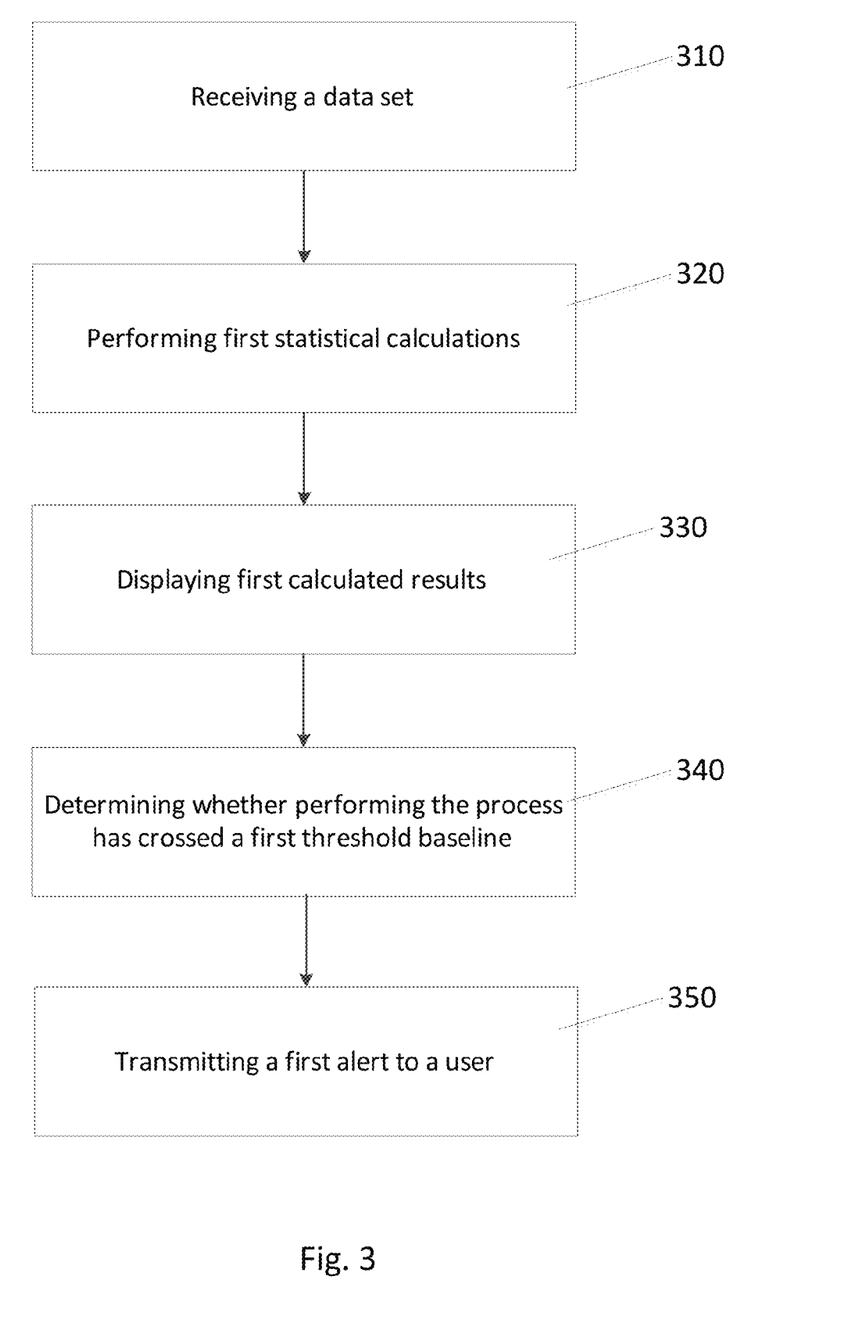
FIG. 3 illustrates a flow diagram of a method according to one embodiment.

FIG. 3 illustrates a logic flow diagram of a method according to certain embodiments of the invention. The method illustrated in FIG. 3 includes, at 310, receiving a data set of values relating to a process. The data set of values correspond to values measured while the process is performed over a duration of time. The method includes, at 320, performing first statistical calculations on a first data subset of values. The values of the first data subset is a subset of the entire received data set of values. The values of the first data subset of values correspond to values that are of a first timeframe of the duration of time. The method, at 330, also includes displaying first calculated results of the first statistical calculations. The method, at 340, also includes determining whether performing the process has crossed a first threshold baseline. The first threshold baseline is based on the first statistical calculations. The method, at 350, also includes transmitting a first alert to a user if the process is determined to have crossed the first threshold baseline.

Figure 4:
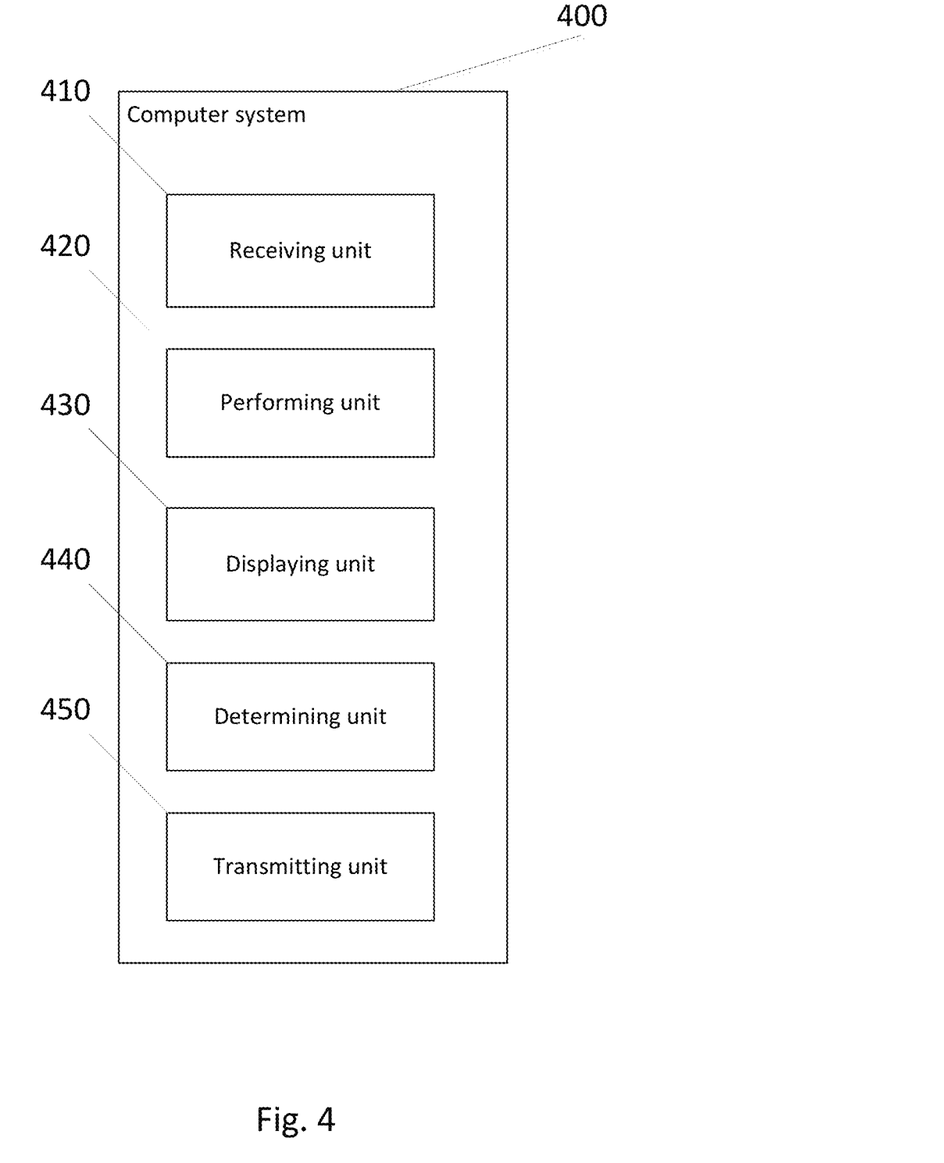
FIG. 4 illustrates an apparatus in accordance with one embodiment.

FIG. 4 illustrates an apparatus 400 in accordance with one embodiment. In one embodiment, apparatus 400 can be a computer system. Apparatus 400 includes a receiving unit 410 that receives a data set of values relating to a process. The data set of values correspond to values measured while the process is performed over a duration of time. Apparatus 400 also includes a performing unit 420 that performs first statistical calculations on a first data subset of values. The values of the first data subset is a subset of the entire received data set of values. The values of the first data subset of values correspond to values that are of a first timeframe of the duration of time. Apparatus 400 also includes a displaying unit 430 that displays first calculated results of the first statistical calculations. Apparatus 400 also includes a determining unit 440 that determines whether performing the process has crossed a first threshold baseline. The first threshold baseline is based on the first statistical calculations. Apparatus 400 also includes a transmitting unit 450 that transmits a first alert to a user if the process is determined to have crossed the first threshold baseline.

Figure 5:
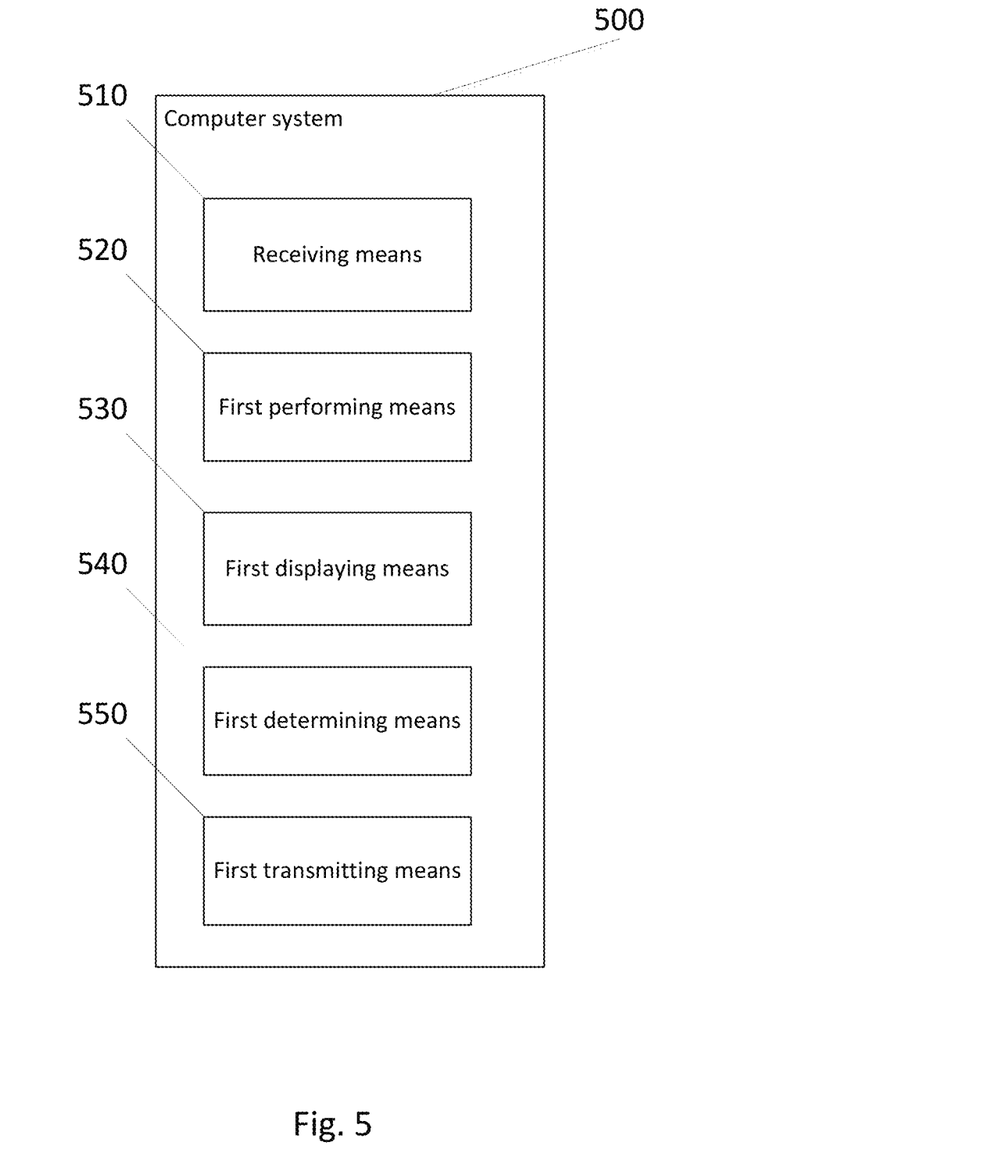
FIG. 5 illustrates an apparatus in accordance with another embodiment.

FIG. 5 illustrates an apparatus 500 in accordance with another embodiment. Apparatus 500 includes receiving means 510 that receives a data set of values relating to a process. The data set of values correspond to values measured while the process is performed over a duration of time. Apparatus 500 also includes first performing means 520 that performs first statistical calculations on a first data subset of values. The values of the first data subset is a subset of the entire received data set of values, and the values of the first data subset of values correspond to values that are of a first timeframe of the duration of time. Apparatus 500 also includes first displaying means 530 that displays first calculated results of the first statistical calculations. Apparatus 500 also includes first determining means 540 that determines whether performing the process has crossed a first threshold baseline. The first threshold baseline is based on the first statistical calculations. Apparatus 500 can also include first transmitting means 550 that transmits a first alert to a user if the process is determined to have crossed the first threshold baseline.

Figure 6:
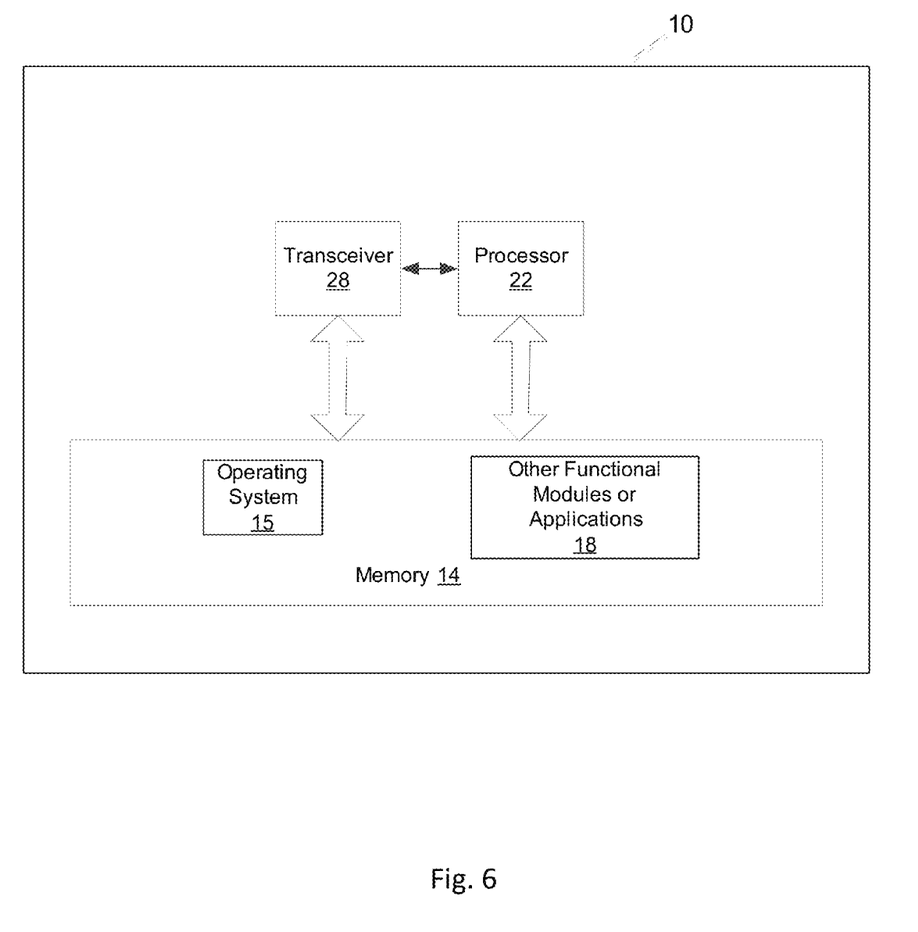
FIG. 6 illustrates an apparatus in accordance with one embodiment.

FIG. 6 illustrates an apparatus 10 according to embodiments of the invention. Apparatus 10 can include a processor 22 for processing information and executing instructions or operations. Processor 22 can be any type of general purpose processor or specific purpose processor. While a single processor 22 is shown in FIG. 6, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In certain embodiments, memory 14 stores software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   receiving, by a processor, a data set of values relating to a process, wherein the data set of values correspond to values measured while the process is performed over a duration of time;
   performing first statistical calculations on a first data subset of values, wherein the values of the first data subset is a subset of the entire received data set of values, and the values of the first data subset of values correspond to values that are of a first timeframe of the duration of time;
   displaying first calculated results of the first statistical calculations;
   generating a first dynamic threshold baseline from results of the first statistical calculations, wherein the first dynamic threshold is continuously updated according to continuous changes of the data set of values as a result of changing environment data;
   determining whether performing the process has crossed the first dynamic threshold baseline, wherein the first dynamic threshold baseline is based on the first statistical calculations;
   displaying a table of the results from the first statistical calculations, the table including the first dynamic threshold baseline; and
   transmitting a first alert to a user if the process is determined to have crossed the first dynamic threshold baseline, the first alert providing an indication of a degree of severity of a problem related to the process.

2. The method according to claim 1, wherein the receiving the data set of values corresponds to receiving numerical values that are regularly sampled over the duration of time.

3. The method according to claim 1, further comprising:
   performing second statistical calculations on a second data subset of values, wherein the values of the second data subset is a subset of the entire received data set of values, and the values of the second data subset of values correspond to values that are of a second timeframe of the duration of time;
   displaying second calculated results of the second statistical calculations;
   determining whether performing the process has crossed a second threshold baseline, wherein the second threshold baseline is based on the second statistical calculations; and
   transmitting a second alert to the user if the process is determined to have crossed the second threshold baseline.

4. The method of claim 1, further comprising displaying a first distribution, wherein the first distribution illustrates the frequency that each value occurs within the first timeframe of the duration of time.

5. The method of claim 1, further comprising displaying a second distribution, wherein the second distribution illustrates the frequency that each value occurs within the second timeframe of the duration of time.

6. An apparatus, comprising:
   at least one processor; and
   at least one memory including computer program code,
   the at least one memory and the computer program code configured, with the at least one processor, to cause the apparatus at least to
   receive a data set of values relating to a process, wherein the data set of values correspond to values measured while the process is performed over a duration of time;
   perform first statistical calculations on a first data subset of values, wherein the values of the first data subset is a subset of the entire received data set of values, and the values of the first data subset of values correspond to values that are of a first timeframe of the duration of time;
   display first calculated results of the first statistical calculations;
   generate a first dynamic threshold baseline from results of the first statistical calculations, wherein the first dynamic threshold is continuously updated according to continuous changes of the data set of values as a result of changing environment data;

determine whether performing the process has crossed the first dynamic threshold baseline, wherein the first dynamic threshold baseline is based on the first statistical calculations;

display a table of the results from the first statistical calculations, the table including the first dynamic threshold baseline; and transmit a first alert to a user if the process is determined to have crossed the first dynamic threshold baseline, the first alert providing an indication of a degree of severity of a problem related to the process.

7. The apparatus according to claim 6, wherein the receiving the data set of values corresponds to receiving numerical values that are regularly sampled over the duration of time.

8. The apparatus according to claim 6, wherein the apparatus is further caused to:

perform second statistical calculations on a second data subset of values, wherein the values of the second data subset is a subset of the entire received data set of values, and the values of the second data subset of values correspond to values that are of a second timeframe of the duration of time;

display second calculated results of the second statistical calculations;

determine whether performing the process has crossed a second threshold baseline, wherein the second threshold baseline is based on the second statistical calculations; and transmit a second alert to the user if the process is determined to have crossed the second threshold baseline.

9. The apparatus according to claim 6, wherein the apparatus is further caused to display a first distribution, wherein the first distribution illustrates the frequency that each value occurs within the first timeframe of the duration of time.

10. The apparatus according to claim 6, wherein the apparatus is further caused to display a second distribution, wherein the second distribution illustrates the frequency that each value occurs within the second timeframe of the duration of time.

11. A computer program product, embodied on a non-transitory computer readable medium, the computer program product configured to control a processor to perform a process, comprising:

receiving a data set of values relating to a process, wherein the data set of values correspond to values measured while the process is performed over a duration of time;

performing first statistical calculations on a first data subset of values, wherein the values of the first data subset is a subset of the entire received data set of values, and the values of the first data subset of values correspond to values that are of a first timeframe of the duration of time;

displaying first calculated results of the first statistical calculations;

generating a first dynamic threshold baseline from results of the first statistical calculations, wherein the first dynamic threshold is continuously updated according to continuous changes of the data set of values as a result of changing environment data;

determining whether performing the process has crossed the first dynamic threshold baseline, wherein the first dynamic threshold baseline is based on the first statistical calculations;

displaying a table of the results from the first statistical calculations, the table including the first dynamic threshold baseline; and transmitting a first alert to a user if the process is determined to have crossed the first dynamic threshold baseline, the first alert providing an indication of a degree of severity of a problem related to the process.

12. The computer program product according to claim 11, wherein the receiving the data set of values corresponds to receiving numerical values that are regularly sampled over the duration of time.

13. The computer program product according to claim 11, wherein the process further comprises:

performing second statistical calculations on a second data subset of values, wherein the values of the second data subset is a subset of the entire received data set of values, and the values of the second data subset of values correspond to values that are of a second timeframe of the duration of time;

displaying second calculated results of the second statistical calculations;

determining whether performing the process has crossed a second threshold baseline, wherein the second threshold baseline is based on the second statistical calculations; and transmitting a second alert to the user if the process is determined to have crossed the second threshold baseline.

14. The computer program product of claim 11, wherein the process further comprises displaying a first distribution, wherein the first distribution illustrates the frequency that each value occurs within the first timeframe of the duration of time.

15. The computer program product of claim 11, wherein the process further comprises displaying a second distribution, wherein the second distribution illustrates the frequency that each value occurs within the second timeframe of the duration of time.

16. An apparatus, comprising:

receiving means that receives a data set of values relating to a process, wherein the data set of values correspond to values measured while the process is performed over a duration of time;

first performing means that performs first statistical calculations on a first data subset of values, wherein the values of the first data subset is a subset of the entire received data set of values, and the values of the first data subset of values correspond to values that are of a first timeframe of the duration of time;

first displaying means that displays first calculated results of the first statistical calculations;

first generating means that generates a first dynamic threshold baseline from results of the first statistical calculations, wherein the first dynamic threshold is continuously updated according to continuous changes of the data set of values as a result of changing environment data;

first determining means that determines whether performing the process has crossed the first dynamic threshold baseline, wherein the first dynamic threshold baseline is based on the first statistical calculations;

second displaying means that displays a table of the results from the first statistical calculations, the table including the first dynamic threshold baseline; and first transmitting means that transmits a first alert to a user if the process is determined to have crossed the first dynamic threshold baseline, the first alert providing an indication of a degree of severity of a problem related to the process.

17. The apparatus according to claim 16, wherein the receiving the data set of values corresponds to receiving numerical values that are regularly sampled over the duration of time.

18. The apparatus according to claim 16, further comprising:
second performing means that performs second statistical calculations on a second data subset of values, wherein the values of the second data subset is a subset of the entire received data set of values, and the values of the second data subset of values correspond to values that are of a second timeframe of the duration of time;
second displaying means that displays second calculated results of the second statistical calculations;
second determining means that determines whether performing the process has crossed a second threshold baseline, wherein the second threshold baseline is based on the second statistical calculations; and
second transmitting means that transmits a second alert to the user if the process is determined to have crossed the second threshold baseline.

19. The apparatus of claim 16, further comprising a third displaying means that displays a first distribution, wherein the first distribution illustrates the frequency that each value occurs within the first timeframe of the duration of time.

20. The apparatus of claim 16, further comprising a fourth displaying means that displays a second distribution, wherein the second distribution illustrates the frequency that each value occurs within the second timeframe of the duration of time.

* * * * *